(12) United States Patent
Strutt

(10) Patent No.: US 8,001,295 B2
(45) Date of Patent: Aug. 16, 2011

(54) OPTIMISATION OF THE SELECTION OF STORAGE DEVICE PORTS

(75) Inventor: Stephen P. Strutt, High Wycombe (GB)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 12/298,050

(22) PCT Filed: Apr. 24, 2007

(86) PCT No.: PCT/EP2007/053979
§ 371 (c)(1),
(2), (4) Date: Oct. 22, 2008

(87) PCT Pub. No.: WO2007/125057
PCT Pub. Date: Nov. 8, 2007

(65) Prior Publication Data
US 2009/0089462 A1    Apr. 2, 2009

(30) Foreign Application Priority Data
Apr. 28, 2006  (GB) .................................. 0608405.7

(51) Int. Cl.
G06F 3/00   (2006.01)
G06F 13/00  (2006.01)
G06F 11/00  (2006.01)

(52) U.S. Cl. .................. 710/36; 710/8; 710/29; 710/31; 711/100; 714/4; 714/100

(58) Field of Classification Search ........................ None
See application file for complete search history.

(56) References Cited

U.S. PATENT DOCUMENTS
7,292,589 B2 * 11/2007 Dhara ........................... 370/401
2002/0126823 A1 * 9/2002 Kumar et al. ............. 379/221.06
2005/0091426 A1 * 4/2005 Horn et al. ....................... 710/33

FOREIGN PATENT DOCUMENTS
| EP | 1 271 296 A2 | 1/2003 |
| EP | 1271296 A2 | 1/2003 |
| WO | WO 03/027856 A1 | 4/2003 |
| WO | WO 2007/125057 A1 | 11/2007 |

OTHER PUBLICATIONS

PCT, "Notification of Transmittal of the International Search Report and the Written Opinion of the International Searching Authority, or the Declaration", International Application No. PCT/EP2007/053979, International Filing Date Apr. 24, 2007.
Zhang Xiao Xiao, Information Materials for IDS, CN Office Action Dated Mar. 24, 2011, 2 pages.

* cited by examiner

*Primary Examiner* — Alan Chen
(74) *Attorney, Agent, or Firm* — Jean M. Sullivan; Hoffman Warnick LLC

(57) ABSTRACT

A port optimization component and method for selecting a pair of ports, each port having predetermined operating parameters, for connecting to a storage device in a storage area network, the port optimization component comprising: a determination component for requesting configuration data and policy data pertaining to a storage device in response to a request to configure access to the storage device; and the determination component for comparing the configuration data to the policy data to determine a difference in operating parameters for each storage device port located on the storage device and in dependence on the detected difference, selecting a pair of ports having a preferred operating parameter.

23 Claims, 7 Drawing Sheets

OPTIMISATION OF THE SELECTION OF STORAGE DEVICE PORTS

FIELD OF THE INVENTION

The invention relates to the field of storage area networks. In particular, the invention relates to the optimisation of the selection of storage device ports.

BACKGROUND OF THE INVENTION

A storage area network (SAN) is a specialised high speed network which is operable for the attachment of servers and storage devices. A SAN allows an 'any-to-any' connection across the network, using interconnected elements such as routers, hubs, switches and directors. A SAN eliminates the traditional dedicated connection between a server and a storage device. A SAN also eliminates restrictions to the amount of data that a server can access, currently limited by the number of storage devices, which can be attached to the individual server.

One aspect of SANs which has proved challenging is the automated provisioning of applications and servers which can be configured and deployed for operating with storage area network attached storage without human intervention. Automated application, server and storage provisioning require that all steps to deploy and configure an application on a server with externally attached storage are automated without human intervention.

The automated provisioning of externally attached storage in a SAN environment comprises a number of linked steps: firstly, the automatic selection of storage volumes, secondly, the secure mapping of the volume to a server from the storage device, thirdly, SAN network path configuration from the server to the storage device and lastly, the creation of volumes and file systems on the server.

The automated provisioning of shared storage resources requires a different storage area network path configuration for each server using storage in the storage area network environment. This must take into account the changing dynamics of the environment as the shared storage resources are consumed by users, and as additional servers and storage devices are added and removed. An automated provisioning manager must therefore be able to determine usage and configuration of resources in the shared storage environment and further determine and implement appropriate storage area network path configuration from the host to the selected storage device without administrator involvement.

Known solutions to the problem of determining storage area network path configuration for storage devices rely on path configurations being created for an application or a server by a skilled SAN administrator. This process can be applied to a single server or a number of servers, but once all the potential connections via the determined configuration path and specific device network ports have been exhausted or have reached maximum utilisation the configuration must be renewed. Alternatively, if the storage device reaches capacity, configuration paths to new storage devices must be determined. In an automated environment path selection must be determined and implemented automatically and adjust to changes in the environment. A key requirement is that the path configuration created obeys the design rules and usage boundaries for the selected storage device. Failure to do so will result in an overall lower level of data availability due to soft and hard failures impacting access to data.

A partial solution to the issues highlighted above is described in US patent application 2003/0005119 A1, published on the 2 Jan. 2003—in which a data path engine is coupled to a storage area network for providing automated storage provisioning between an application on a storage area network attached server and a data volume on a storage area network attached storage subsystem. The apparatus provides a user interface that allows operators to use pre-created policies for criteria in order to select data paths that meet organisation's uptime and performance requirements. However, US 2003/0005119 does not address aspects of the problem of determining the most suitable paths and storage device ports for handling a provisioning request. Solving this problem in a storage area network is vital as in addition to maximising utilisation and spreading workload evenly throughout the storage area network, the configurations created must be within the supported design parameters of the storage device and best usage practices.

DISCLOSURE OF THE INVENTION

Thus viewed from a first aspect the present invention provides a port optimisation component for selecting a pair of ports, each port having predetermined operating parameters, for connecting to a storage device in a storage area network, the port optimisation component comprising: a determination component for requesting configuration data and policy data pertaining to a storage device in response to a request to configure access to the storage device; and the determination component for comparing the configuration data to the policy data to determine a difference in operating parameters for each storage device port located on the storage device and in dependence on the detected difference, selecting a pair of ports having a preferred operating parameter.

Advantageously, the port optimisation component provides for the selection of storage device ports to take into account the hardware component failure modes and to minimise the number of paths lost to a host by the failure of a single hardware component. Further, the present invention advantageously provides the ability to apply storage device vendor's configuration information and restrictions to create valid and supported storage device configurations. This also provides for the discovery of operating parameters such as the number of hosts which can be connected to a port or a cluster in a modular storage device. The port optimisation component further provides for the inclusion of path selection storage resources reserved to meet known future application requirements. This comprises resources such as expected input/output load and bandwidth port slots to accommodate new host attachment to a storage device.

Preferably, the port optimisation component provides for a determination component detecting for each port the current operating load of each port and the maximum operating load of each port to determine a list of eligible pairs of ports for port selection.

Preferably, the port optimisation component provides for the determination component determining from the policy rule associated with the requested storage device, the architecture type of each pair of eligible pair of ports.

Preferably, the port optimisation component provides for the determination component identifying any restrictions to a storage volume of the requested storage device via the eligible pair of ports.

Preferably, the port optimisation component also provides an update component which restricts the list of eligible pairs of ports in response to the determination component determining the pairs of ports satisfying a performance criterion.

Preferably, the port optimisation component provides for policy rules which comprise operating parameter data of the storage device.

Preferably, the port optimisation component provides for an update component for updating the configuration data with current operating parameters of the requested storage device. Thus, the port optimisation component is able to continually optimise port selection by continually updating the configuration data for each storage device.

Preferably, the port optimisation component provides for a query component for querying each storage device, operating within the storage area network, for identifying current operating parameters of each of the storage devices.

Preferably, the port optimisation component further comprises a communication component for communicating additions or exclusions of eligible pairs of ports for selection.

Preferably, the port optimisation component comprises configuration data comprises the current operating parameters of each storage device operating within the storage area network.

Preferably, the port optimisation component provides for the determination component further comprising determining whether there are enough storage device ports available to meet requested data path requirements.

Viewed from a second aspect, the present invention provides a method for selecting a pair of ports for connecting to a storage device in a storage area network, each port having predefined operating parameters, the method comprising the steps of: requesting configuration data and policy data pertaining to a storage device in response to a request to configure access to the storage device; and comparing the configuration data to the policy data to determine a difference in operating parameters for each storage device port located on the storage device and in dependence of the detected difference, selecting a pair of ports having a preferred operating parameter.

Viewed from a third aspect the present invention provides a computer program product loadable into the internal memory of a digital computer, comprising software code portions for performing, when said product is run on a computer, to carry out the invention as described above.

BRIEF DESCRIPTION OF THE DRAWINGS

Embodiments of the invention are described below in detail, by way of example only, with reference to the accompanying drawings in which.

DETAILED DESCRIPTION OF THE INVENTION

Figure 1:
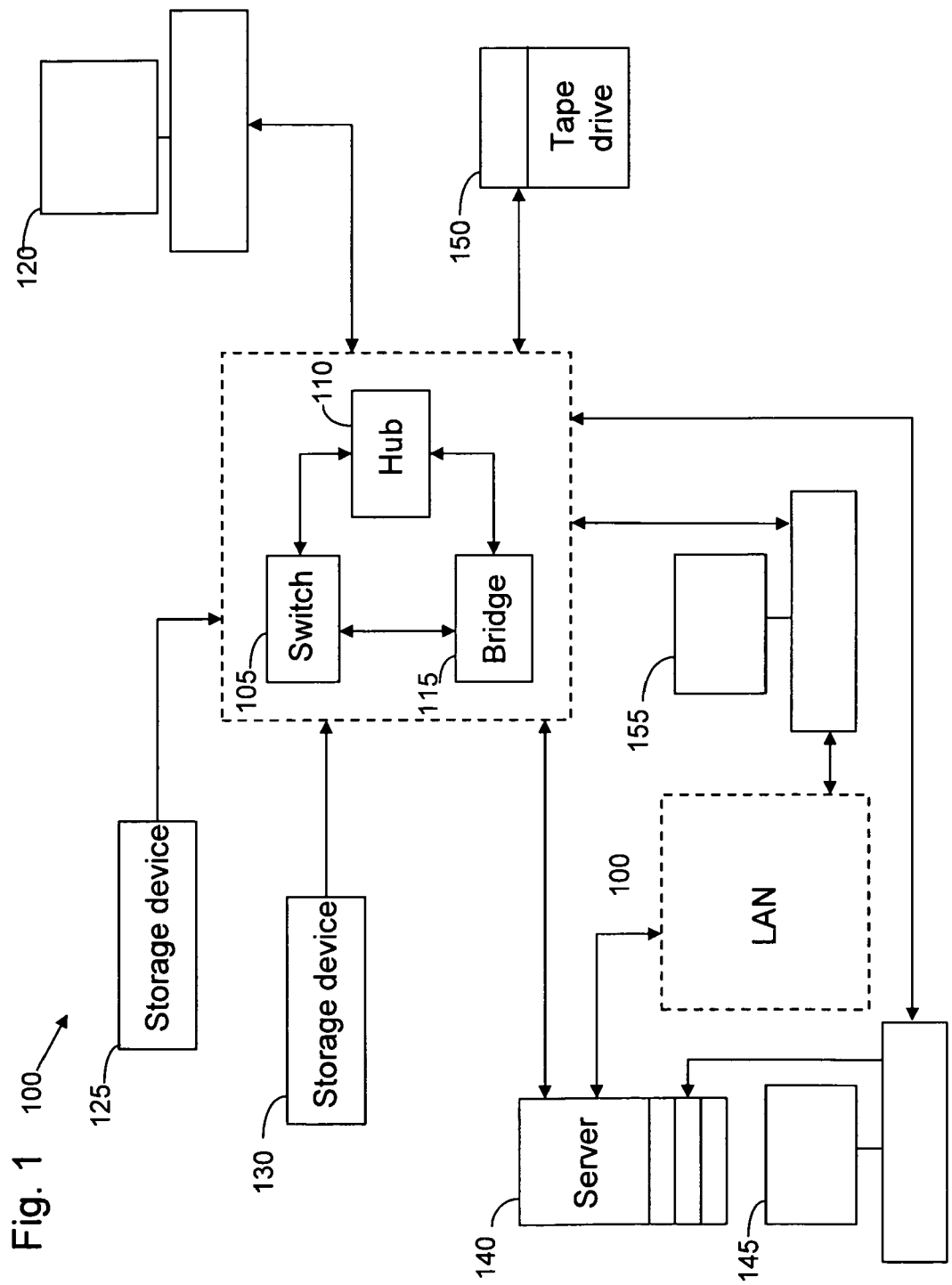
FIG. 1 is a prior art diagram of a typical storage area network.

FIG. 1 shows a typical storage area network 100 (commonly known as a SAN). The SAN 100 comprises many different hardware components—the totality of which make-up the storage area network 100. The SAN 100 allows an 'any-to-any' connection across the network 100, using interconnect elements such as switches 105, hubs 110 and bridges 115. These interconnect elements perform such functions as data frame routing, media and interface conversion (i.e. copper to optical fibre), network enhancement and bandwidth management and allow for the connection of hardware peripherals such as, primary storage devices 125, 130 (for example, RAID systems), servers 140 and back-up systems such as tape drives 150. Other types of hardware peripherals connected to the SAN 100 are computer systems 120, 145, 155. Data to be accessed or stored is located on storage systems 125, 130 such as, for example a RAID storage system.

Each storage device 125, 130 comprise one or more storage volumes. A storage volume divides up the physical storage disk into a number of partitioned volumes without regard to the physical layout or topology of the actual storage elements. Typically, virtual volumes are presented to the operating system as an abstraction of a physical disk and are used by operating systems as if they were separate physical disks. Thus data can be stored on each virtualised volume.

Typically, a management server 140 is installed which manages the storage devices 125, 130 connected to and connecting from the SAN 100. The management server 140, by the use of a query mechanism, is aware of all of the storage devices and hosts connected to the SAN network 100 and their unique addresses.

The management server 140 interfaces with a switch 105 for configuring the routing of data (application data) to the required storage device 125, 130 in the SAN 100. For example, if a computer system 120, 145, 155 needs to access a virtual storage volume to store a word processing document, the management server 140 responsible for managing path setup from the computer system 120, 145, 155, receives the request and communicates with the switch instructing the switch to setup a logical path from the computer system 120, 145, 155 with a particular port on the storage device. The switch 105 interfaces with a hub 110 and a bridge 115 in order to store the data.

In a fibre channel environment, for example, each storage device port is given a unique identifier: for example, a unique hexadecimal code which forms a 24-bit address. The switch 105 is responsible for maintaining and assigning unique identifiers to device ports. For example, referring to FIG. 2, a storage device 125 is shown having two bays 200, 205, each bay having two adapters 230, 235, 240, 245 each adapter having a number of ports 210, 220, 230, 240. The switch 105, on identifying the storage device 125, 130 registered on the SAN, assigns each port a unique identifier. For example:

| Port number | unique identifier |
| --- | --- |
| 210 | aabbcc |
| 215 | ddeeff |
| 220 | gghhii |
| 225 | jjkkll |

Thus the switch 105 on receipt of a request to forward data to a storage device port 210, 215, 220, 225 performs a lookup in a data store to determine the unique identifier of the port on the SAN 100 in order to route the data onto the required storage device.

Figure 2:
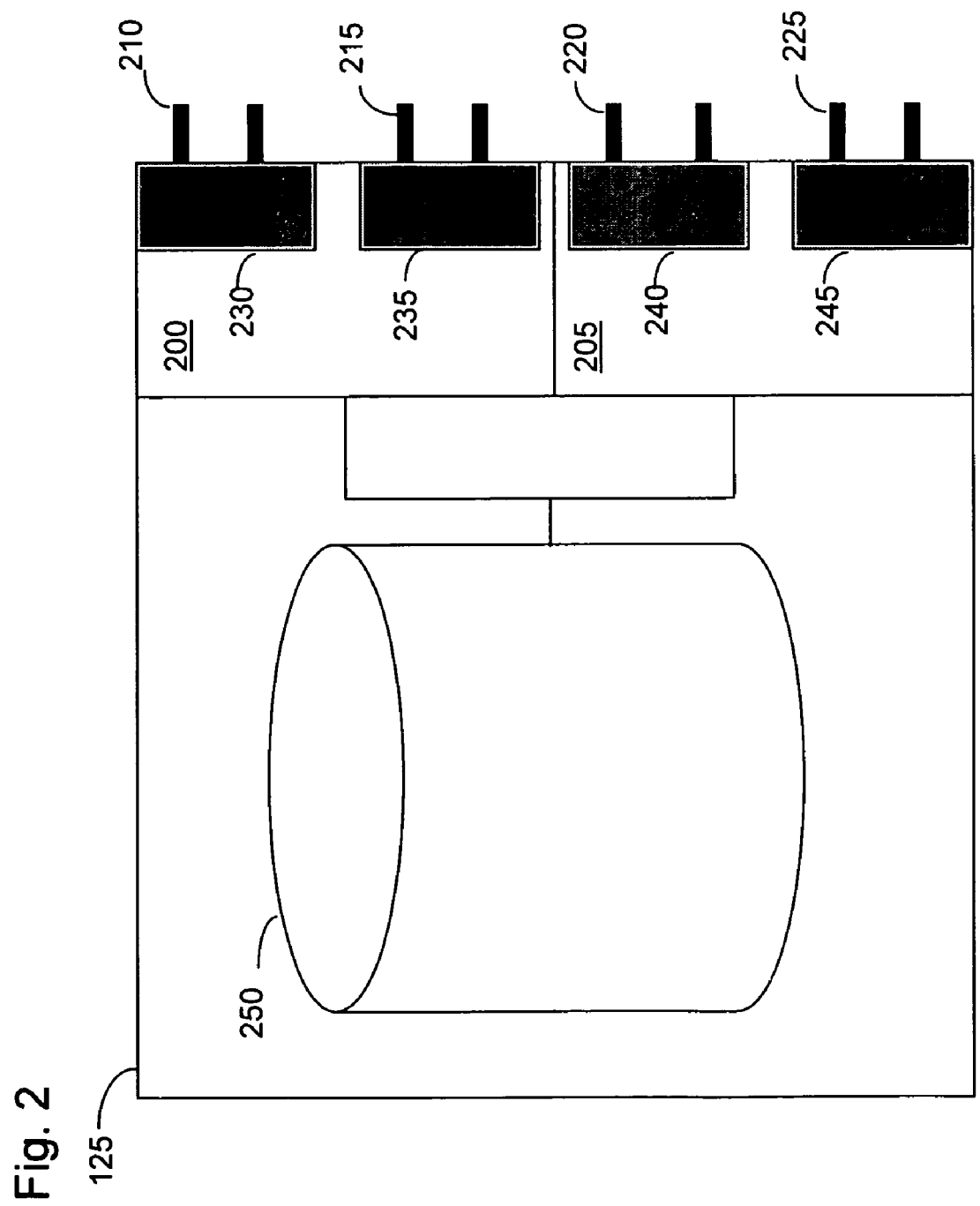
FIG. 2 is a block diagram showing a number of pairs of ports of a storage device as is known the art.

As is shown in FIG. 2, a storage device 125 can have many adapters 230, 235, 240, 245 and ports 210, 215, 220, 225. Multiple ports are used and hence multiple data paths. This enhances data availability because in the case where one port fails, data can still reach the storage device via another port. Additionally multiple ports also allow data workload to be distributed minimising performance bottlenecks. In order to store data on the storage device 125, 130, a host, for example, a server 140 communicates with the storage device 125 via a number of ports 210, 215, 220, 225. At a minimum this typically would be a pair of ports, connected over two separate networks. Typically a SAN 100 would be made up of two redundant networks to provide complete fault tolerance in the case of a failure of one network. For the remainder of this specification all references are to a single SAN 100, but it is assumed that when pairs of ports are referred to, each port is connected in a different network.

In order to determine which storage device ports 125, 130 are best suited to the requestor's requirements in order to create a valid supported configuration, a port optimisation component 300 is provided.

Figure 3:
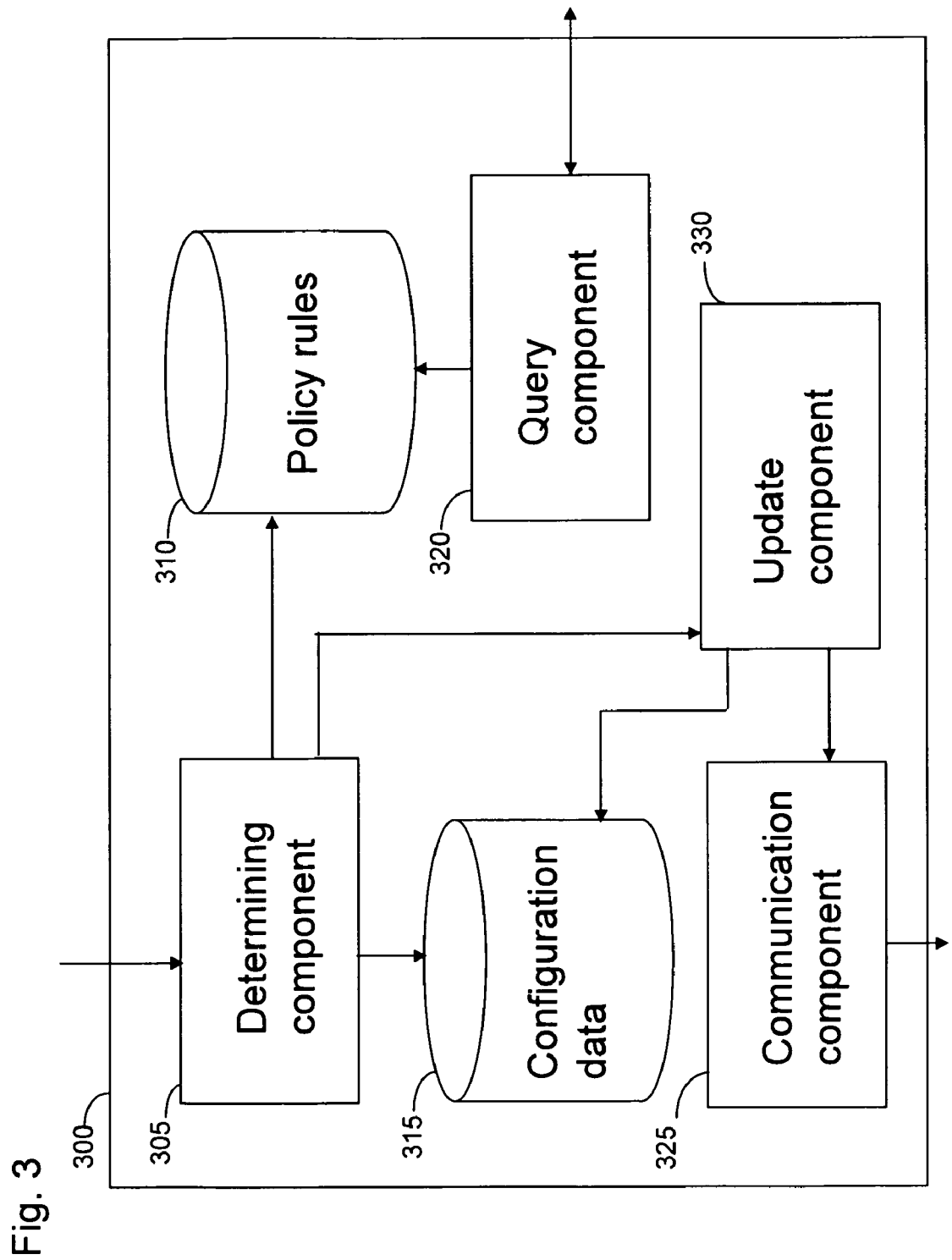
FIG. 3 is a block diagram illustrating the components of the port optimisation component in accordance with a preferred embodiment of the present invention.

With reference to FIG. 3, the port optimisation component 300 of a preferred embodiment of the present invention is shown. The port optimisation component 300, on trigger of a request to setup multiple paths to access a storage volume, compares policy rules and configuration data to determine if the request can be met and if so which ports on the storage device 125, 130 are the most suitable ports 210, 215, 220, 225 to handle the request.

The port optimisation component 300 analyses policy rules and configuration data in order to determine a) which ports 210, 215, 220, 225 are available for use (working/online and where usage falls within the supported and design characteristics of the storage device) on the storage device 125, 130, and b) out of the available ports which ports are better suited to handling the requestor's request.

The port optimisation component 300 may be installed on the server 140 acting as a management server, on the switch 105, or on the storage device 125, 130. The port optimisation component 300 comprises a number of sub components which interact and interface with each other in order to determine the most suitable and available ports for handling storage requests across the SAN network 100.

The sub components comprise a determining component 305 for comparing policy rules and configuration data in order to determine whether a storage request can be handled and if so which ports are the most suitable ports for handling the storage request, a data store for storing configuration data 315, a data store for storing policy rules 310, a query component 320 for querying devices within the SAN network 100 and an update component 330 for updating the configuration data with the output of the determining component 305. Each of these components will be explained in turn.

The determining component 305 receives requests from the management server 140 requesting the use of an existing storage volume located on a storage device 125, 130, or a request for a new storage volume to be created on existing spare capacity on the storage device 125, 130. The determining component 305 on receipt of this request retrieves configuration data pertaining to the requested storage device 125, 130 and also retrieves policy rules associated with the configuration data; i.e. every storage device 125, 130 located within the SAN network 100 has associated configuration data and one or more associated policy rules. Policy rules are determined by the design and implementation of the storage device. Policy rules may comprise rules which state the maximum performance limit or alternatively rules which state the connection limits which must not be exceeded because otherwise a failure could occur resulting in loss of access to data or degraded performance. Rules may also apply to supporting components such as multipathing drivers, for example the maximum number of paths allowed and consequently the maximum number of ports to be selected.

The determining component 305 compares the policy rules to the configuration data and determines any differences in the parameters of the policy data compared to the configuration data. For example, the configuration data, for a particular storage device 125, 130, may state that twelve servers are connected to the storage device. However, the policy rule may state that a total of twenty servers can be connected to the storage device 125, 130. Thus the determining component 305 determines that a further eight servers can be connected to the storage device 125, 135. The determining component 305 transmits the calculation to the update component 330 for communicating the data to the communication component 325 and for updating the configuration data with the new server usage information if the multi path access configuration request is successful.

For example, the request may request access to an existing storage volume on a storage device 125, 130. The determining component 305 receives this request and extracts the relevant information. For example, the request may comprise the following information:
Storage volume to be accessed
Number of data paths required
Anticipated I/O profile or load The determining component 305 sends a request to the configuration data store 315 requesting access to the configuration data of the storage device on which the storage volume is located. A further request is transmitted to the policy rules data store 310 to request access to the policy rules associated with the storage device. The determining component 305 compares the configuration data to the policy rules to determine any differences. For example, if the configuration data states that the storage device currently has a total of twelve hosts connected to port 'A' and the policy rule states that a total of twenty hosts may be connected to the storage device via port 'A'. Hence, the determining component 305 determines that a further eight hosts can be connected to this port on the storage device 125, 130 and thus this port is acceptable to be used. All ports in the storage device 125, 130 which are accessible to the server over the SAN network are analysed. Any which do not meet the policy rules are dropped from the list of suitable ports. Each policy rule is applied in turn. When all policy rules have been applied the output of this is a group of ports which are eligible to be used. All ports in this group will create a valid configuration which is within the accepted device usage boundaries and is supported by the storage devices' vendors and designers.

Further rules are applied which relate to the architecture of the storage device. Architecture may determine accessibility to specific storage volumes within the storage device via specific ports. The specific ports that can be used to access a storage volume depend on the volume and configuration of the storage device.

As explained with reference to the determining component 305, the configuration data, stored in the data store 315, comprises configuration data about each storage device located within the SAN fabric. The configuration data 315 details the characteristics of the storage hardware, for example, how many ports are located in the storage device, the architecture of the storage device (i.e. modular or monolithic), how the ports are configured internally, hardware specific information, how the ports are connected to the internal storage. This information is static in its nature and is classed as administrator-defined information. The configuration data also comprises a second type of information which is of a more dynamic nature and is updated by the update component 330 and from external sources such as a management server 140 which queries all storage devices in the SAN fabric and keeps it updated as the environment changes. This configuration data comprises data such as how many data paths are using a port on the storage device, how many hosts are already connected to the storage device and ports connected to the switch 105. This data could be held in the configuration data store itself, or the storage device, 125, 130 and queried from the device as required.

The policy rules are stored in a data store 310. The policy rules define specific rules for each storage device. An example policy rule defines how many hosts can be connected to a storage device via a set of ports at any one given time. The policy rules may be administrator-defined or alternatively, the storage device may be queried by a query component 320 for the policy rules.

The update component 330 interfaces with the determining component 305 and the communication component 325. The update component 330 updates the dynamic configuration data stored in the data store 315 with the new usage information if the request is accepted. For example, incrementing the connected host count by the one, or the path count on a port. The update component also transmits a notification to the communication component for transmitting back to the requestor informing of the acceptance or denial of the request.

Figure 4:
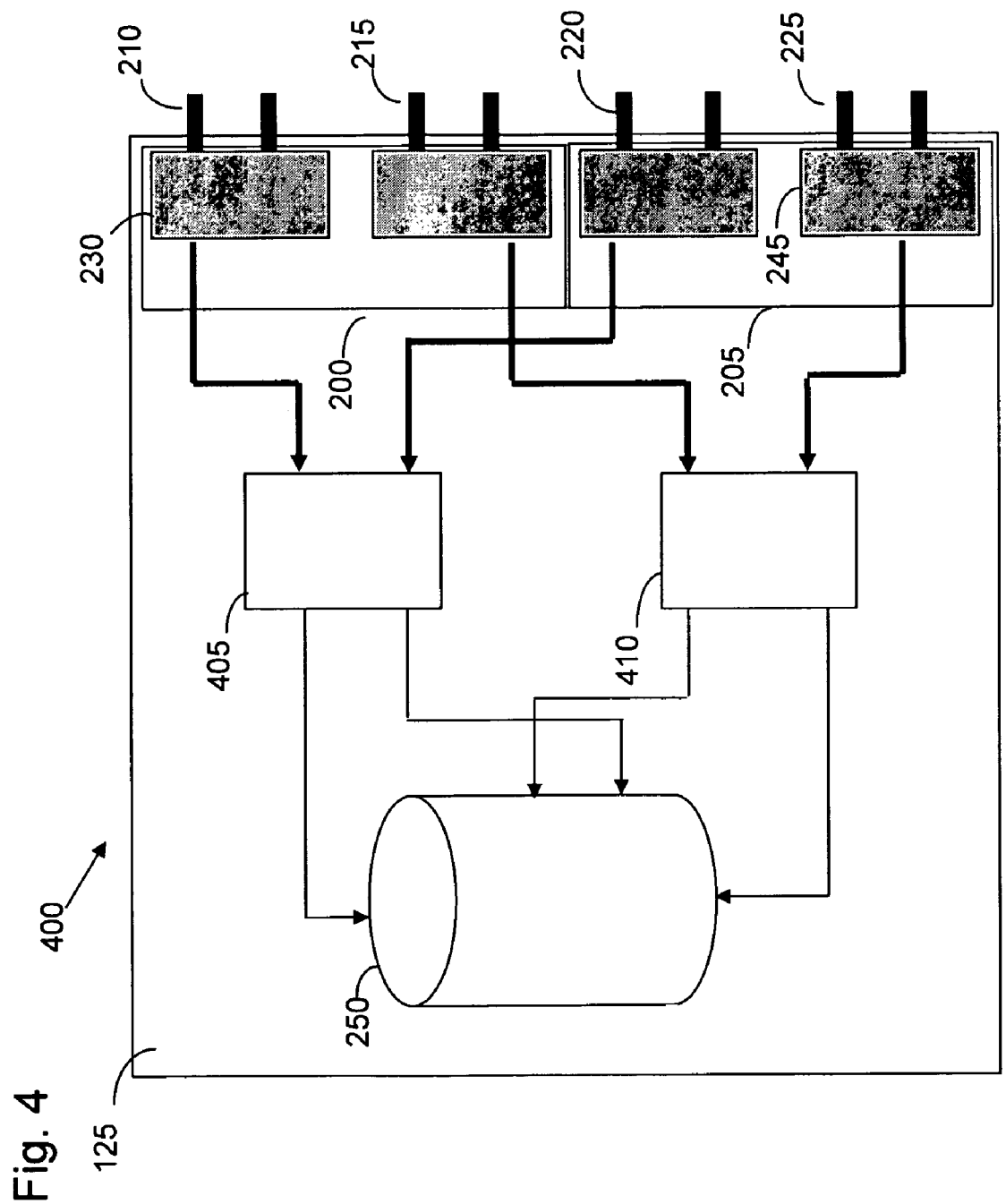
FIG. 4 is a block diagram showing a monolithic architecture of a storage device as is known in the art.
Figure 5:
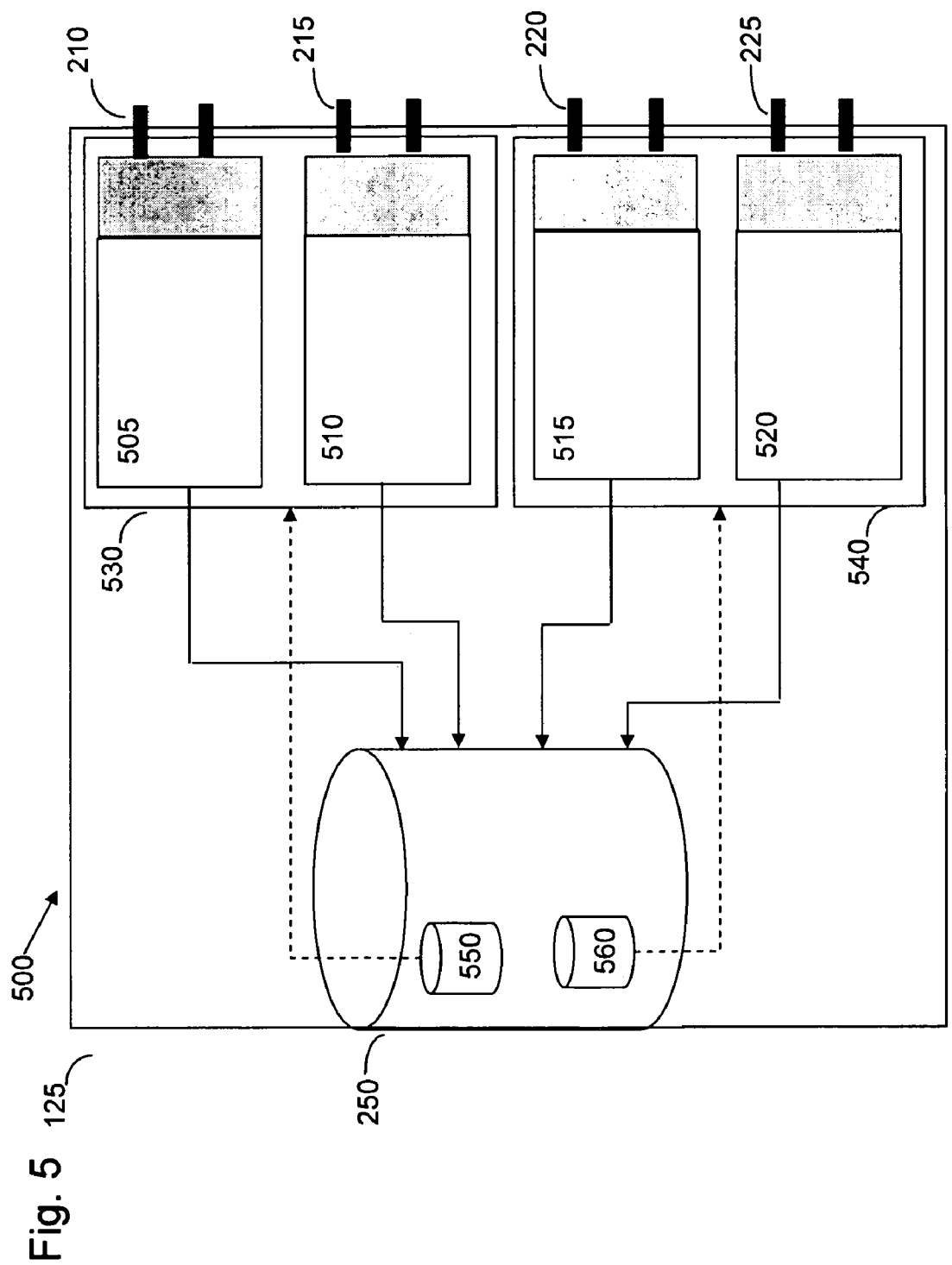
FIG. 5 is a block diagram showing a modular architecture of a storage device as is known in the art.

As previously mentioned, there are two basic types of storage device architectures, described here as monolithic and modular. FIG. 4 shows a monolithic architecture and FIG. 5 shows a modular architecture. Storage devices 125, 130 vary in design and implementation, but broadly fall into these two categories, but may have characteristics of both architectures.

Referring to FIG. 4 a monolithic storage device 400 is shown. A monolithic architecture often comprises just two control units 405, 410 (CPUs, processors, nodes, controllers) connected to a number of storage device ports 210, 215, 220, 225. Ports are either dedicated to a single control unit or are connected to both control units. In operation storage is accessed via the following steps:

A request to read or write data to a storage volume 210 will come in via a specific port 210, 215, 220, 225 and is routed to a control unit 405, 410 for processing. Typically a volume will have a preferred control unit 405, 410 through which data access requests will be performed. The control unit 405, 410 performs the data access request on the storage volume 210. There are no restrictions on which ports 210, 215, 220, 225 can be used to access a volume 250. Though there may be preferred ports 210, 215, 220, 225 which are used for normal access and non-preferred ports 210, 215, 220, 225 which may be used to access a storage volume 250 in the case of internal component failure of the preferred ports 210, 215, 220, 225 or controller 405, 410.

The choice of ports 210, 215, 220, 225 to use for data access will however depend on the design of the storage device 125, 130. To maximise access availability, the ports 210, 215, 220, 225 chosen for server access should be such that a failure of an internal component minimises the impact by minimising the number of paths lost. For example the ports chosen should be connected across different internal data busses, power supplies, adapter bays, adapters and if connected directly to a control unit across both control units. One approach to port selection is port 'availability pairs'. Due to the typical dual redundancy of components, a specific port will have a partner which is least likely to be affected by failures of different components affecting access through the first port. This partner port will also typically be on a second redundant SAN network referred to earlier.

FIG. 5, shows a modular storage device 500 comprising a number of control units 505, 510, 515, 520 usually combined in pairs as a number of clusters, such as virtualisation appliances. In this instance, there are often several control units (505, 510, 515, 520) and it is often typical that all ports 210, 215, 220, 225 do not have connectivity to all control units i.e. access is via a subset of ports attached to a control unit of a clustered pair of control units. In addition existing storage volumes or portions of the storage will have pre-assigned ownership to pairs of control units 505, 510, 515, 520 (clusters) in the storage device 125, 130. In this figure volume 550 can only be accessed via port 210 and port 215 as ownership has been assigned to the cluster 530 i.e. control units 505 and 510.

In operation the following process steps are performed. A request to read or write data to volume 550 must come in via ports 210 and 215, and depending on the access port it is routed to control unit 505 or 510 for processing. Typically storage volume 550 will have a preferred control unit, 505 or 510 through which data access requests will normally be performed. The control unit will then perform the data access request on the storage volume.

In this architecture access to volume 560 cannot be performed through ports 210 and 215 as this storage volume is assigned to cluster 530. Only ports 220 and 225 can be used for data access as these connect to control units 515 and 520. In this modular architecture port selection is restricted by the assignment of storage volumes to clusters.

Figure 6:
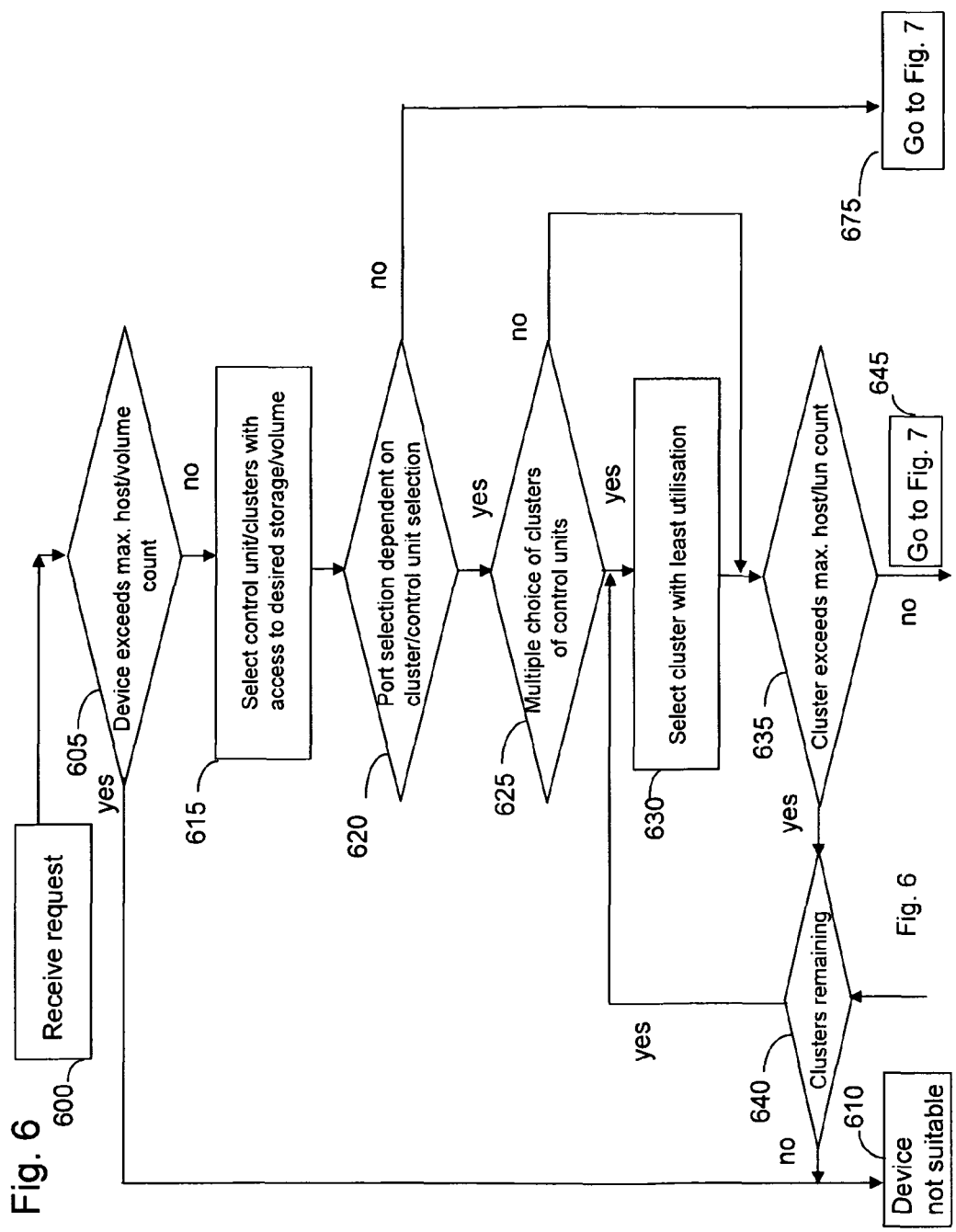
FIGS. 6 and 7 are a flow chart detailing the operational steps of a preferred embodiment of the present invention.
Figure 7:
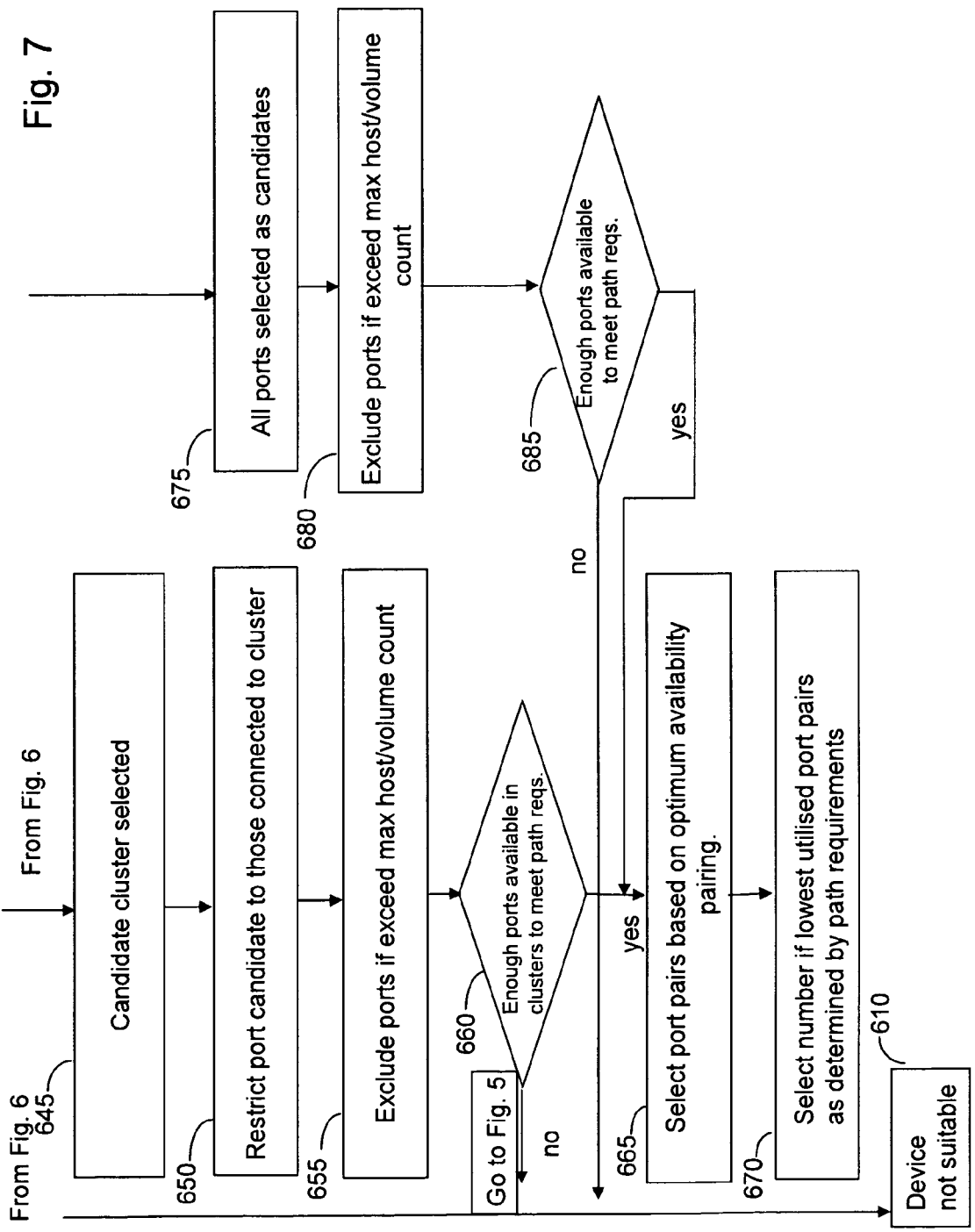

Referring to FIGS. 6 and 7 the operational steps of the optimisation component 300 are shown which take into account both types of architecture as explained above. At step 600, the port optimisation component 300 receives a request from a requester to configure path access to a storage volume 250 on a storage device 125, 130. Typically, the requester selects from a preference list a storage volume 250 that meets their storage requirements—for example, a storage volume 250 which can store one gigabyte of data and offers a particular response time etc. Alternatively, it is identified that the storage device 125, 130 has free capacity where a volume could be created with the desired characteristics. (This selection of the device with free capacity or existing storage volume is addressed by prior art and is not discussed further). The port optimisation component 300 receives the request and the determining component 305 extracts the name of the storage device 125, 130 and the requestor's storage requirements. The determining component 300 sends a request to the configuration data store 315 and the policy data store 310 for access to the configuration data and the policy data for the storage device 125, 130 named in the request.

The determination component 305 at step 605 determines whether the selected storage device 125, 130 already exceeds the maximum number of hosts that can be connected to the storage device 125, 130 or the total number of allowed storage volumes 210. If the determination is positive control moves to step 610 and a notification is sent to the requester via the communication component 325 informing the request of the unsuitability of the selected storage device 125, 130. The requester is then prompted to select another storage device 125, 130 from the preference list, reselection of another device could happen automatically or with human intervention from a list of selected devices with the desired characteristics and free space as determined by prior art.

If the determination is negative and the number of hosts connected to the storage device does not exceed the maximum number of possible hosts, control moves to step 615 and the control units or clusters which have access to the requested storage are selected which meet the requesters quality or service requirements i.e. the storage device 125, 130 must be able to store one gigabyte of data, have a performance response time of x number of seconds and an availability level of RAID 5 for example.

Next at step 620, the determination component 305 determines whether the port selection is dependent on the cluster or control unit selection—this is achieved by determining the architecture type of the storage unit.

If the architecture type is monolithic (i.e. port selection is not dependent on storage volume to control unit assignment) control moves to step 675 of FIG. 7 and all of the selected storage device's ports are selected as candidates for port selection. At step 680, a determination is made as to whether the ports should be excluded if the maximum host or volume count is exceeded on a port. A decision is made at decision 685 as to whether there are enough ports available to meet the data path requirements on the access request. If the determination is negative control moves to step 610 of FIG. 6. If the determination is positive control moves to step 665 of FIG. 6.

Moving back to step 620 of FIG. 6, if the port selection is dependent on the cluster/control unit selection i.e. a modular architecture, control moves to step 625. A further determination is made as to whether there are multiple clusters of control units to choose from. If the volume already exists and is assigned to a cluster, there is only one possible cluster to choose from and control moves to step 635. If the volume 210 has yet to be created and there are multiple clusters that can access the same storage capacity 525, control moves to 630. The determination component 305 determines from the dynamic configuration data the cluster with the lowest utilisation, for example this may be CPU (control unit processor) or throughput utilisation. Control moves to step 635 and the determination component 305 determines whether the cluster selected already has the maximum amount of hosts or volumes already attached to it by comparing the configuration data against the policy rules. If the cluster has not reached its maximum host and volume counts, control passes to step 645 of FIG. 7 and the cluster is selected.

At step 650 the determination component 305 restricts the port candidates to the ports identified as connected to the selected cluster. Again, this is achieved by identifying the relevant configuration data for the storage device 125, 130. At step 655 a further determination is made by the determination component 305 as to whether any of the port candidates have reached their maximum connected host count—by comparing the storage device's configuration data with its corresponding policy rule. If the determination is positive, the ports that do exceed their maximum host count are excluded from the candidate port list. Control moves to step 660 and the determination component 305 determines whether there are enough candidate ports available in the selected cluster that meet the requesters multi path requirements. If the determination is positive control moves to steps 665 and 670 and the optimal availability pairings of ports are selected by selecting the required number of pairs of ports with the lowest utilisation to meet the data path requirements, but no more pairs than are supported by the associated multipathing driver.

Moving back to step 635, if the determination is positive and there are not enough ports available in the cluster to meet the requesters requirements control moves to step 640 and a further determination is made as to whether the there are any remaining clusters for the selected storage device 125, 130. If there are no clusters available the determination component 305 transmits a message to the update component 330 for informing the requester of the unsuitability of the storage device 125, 130 and the requestor is prompted to select another storage device 125, 130 from the preference list. If on the other hand the determination is positive and there are clusters remaining for the storage device control moves to step 630 and the process steps commence from step 630 as previously described until the optimum pairs of ports have been selected. At the conclusion of a successful request the update component updates the configuration data with the new usage counts, for example hosts connected to the device, host connections per port and volumes per port.

Additionally when data path access is removed due to decommissioning of a server or application, usage counts are decremented, for example host and port connection usage counts.

Subsets of this process are used if additional volumes are required for a host with an existing path configuration to the device. The existing path configuration must be revalidated to determine if the additional volume or volumes can be accessed by the existing port selections. Otherwise a new port selection must be determined.

This methodology can also be applied when rebalancing of I/O workload is required to remove bottlenecks caused by throughput congestion on specific ports.

The invention claimed is:

1. A port optimisation component for selecting a pair of ports, each port having predetermined operating parameters, for connecting to a storage device in a storage area network, the port optimisation component comprising:
   a determination component for:
   requesting configuration data and policy data pertaining to a storage device in response to a request to configure access to the storage device;
   comparing the configuration data to the policy data to determine a difference in operating parameters for each storage device port located on the storage device; and
   in dependence on the detected difference, selecting a pair of ports having a preferred operating parameter;
   wherein the storage area network comprises a pair of redundant networks for providing fault tolerance in case of a failure of one of the two redundant networks, wherein a first port of the pair of ports is connected to a first network of the pair of redundant networks, and wherein a second port of the pair of ports is connected to a second network of the pair of redundant networks.

2. A port optimisation component as claimed in claim 1 wherein the determination component further comprises detecting for each port a current operating load of each port and a maximum operating load of each port to determine a list of eligible pairs of ports for port selection.

3. A port optimisation component as claimed in claim 2 wherein the determination component further determines from a policy rule associated with the requested storage device, an architecture type of each eligible pair of ports.

4. A port optimisation component as claimed in claim 2 wherein the determination component further comprises identifying any restrictions to a storage volume of the requested storage device via each eligible pair of ports.

5. A port optimisation component as claimed in claim 2 wherein an update component restricts the list of eligible pairs of ports in response to the determination component determining the pairs of ports satisfying a performance criterion.

6. A port optimisation component as claimed in claim 3 wherein the policy rule comprises operating parameter data of the storage device.

7. A port optimisation component as claimed in claim 1 further comprising an update component for updating the configuration data with current operating parameters of the requested storage device.

8. A port optimisation component as claimed in claim 1 further comprising a query component for querying each storage device, operating within the storage area network, for identifying current operating parameters of each of the storage devices.

9. A port optimisation component as claimed in claim 2 further comprising a communication component for communicating additions or exclusions of eligible pairs of ports for selection.

10. A port optimisation component as claimed in claim 1 wherein configuration data comprises current operating parameters of each storage device operating within the storage area network.

11. A port optimisation component as claimed in claim 1 wherein the determination component further comprises determining whether there are enough storage device ports available to meet requested data path requirements.

12. A method for selecting a pair of ports for connecting to a storage device in a storage area network, each port having predefined operating parameters, the method comprising:
requesting configuration data and policy data pertaining to a storage device in response to a request to configure access to the storage device; and
comparing the configuration data to the policy data to determine a difference in operating parameters for each storage device port located on the storage device and in dependence of the detected difference, selecting a pair of ports having a preferred operating parameter;
wherein the storage area network comprises a pair of redundant networks for providing fault tolerance in case of a failure of one of the two redundant networks, wherein a first port of the pair of ports is connected to a first network of the pair of redundant networks, and wherein a second port of the pair of ports is connected to a second network of the pair of redundant networks.

13. A method as claimed in claim 12 wherein the comparing further comprises detecting for each port within the pair or ports a current operating load of each port and a maximum operating load of each port to determine a list of eligible pairs of ports for port selection.

14. A method as claimed in claim 12 wherein the comparing further comprises determining from the policy rule associated with the requested storage device, an architecture type of each pair of eligible pair of ports.

15. A method as claimed in claim 13 wherein the comparing further comprises identifying any restrictions to a storage volume of the requested storage device via each eligible pair of ports.

16. A method as claimed in claim 13 further comprising restricting the list of eligible pairs of ports in response to the determining step further determining the pairs of ports satisfying performance criterion.

17. A method as claimed in claim 12 further comprising updating the configuration data with current operating parameters of the requested storage device.

18. A method as claimed in claim 12 further comprising querying each storage device, operating within the storage area network, for identifying current operating parameters of each of the storage devices.

19. A method as claimed in claim 12 further comprising communicating additions or exclusions of eligible pairs of ports for selection.

20. A method as claimed in any claim 12 wherein the policy rules comprises operating parameter data of the storage device.

21. A method as claimed in claim 12 wherein configuration data comprises current operating parameters of each storage device operating within the storage area network.

22. A method as claimed in claim 12 wherein the determining further comprises determining whether there are enough storage device ports available to meet requested data path requirements.

23. A computer program product loadable into the internal memory of a digital computer, for selecting a pair of ports for connecting to a storage device in a storage area network, each port having predefined operating parameters, when said product is run on a computer, comprising software code portions for:
requesting configuration data and policy data pertaining to a storage device in response to a request to configure access to the storage device; and
comparing the configuration data to the policy data to determine a difference in operating parameters for each storage device port located on the storage device and in dependence of the detected difference, selecting a pair of ports having a preferred operating parameter;
wherein the storage area network comprises a pair of redundant networks for providing fault tolerance in case of a failure of one of the two redundant networks, wherein a first port of the pair of ports is connected to a first network of the pair of redundant networks, and wherein a second port of the pair of ports is connected to a second network of the pair of redundant networks.

* * * * *